UNITED STATES PATENT OFFICE.

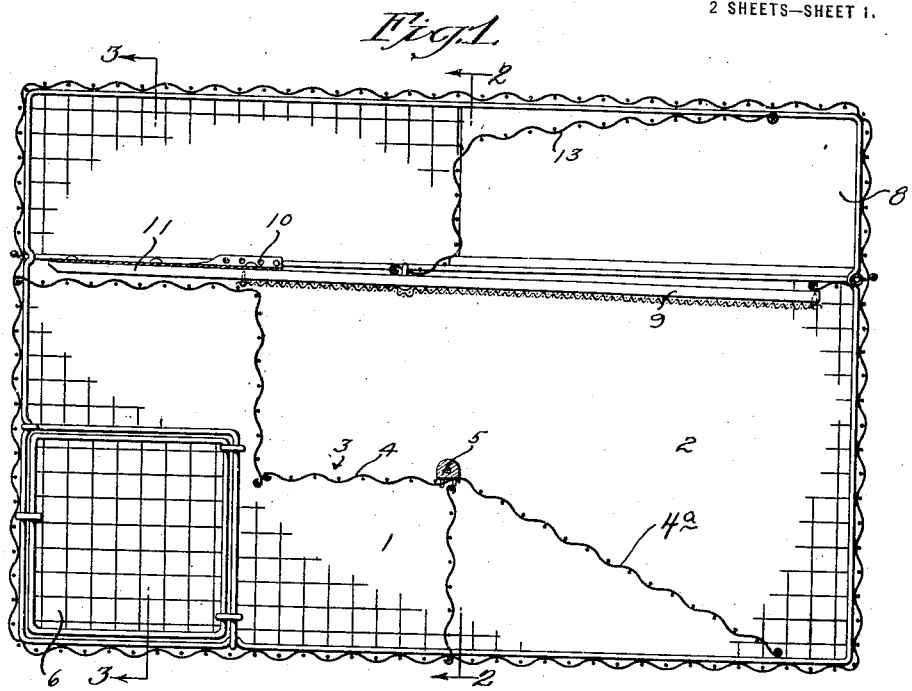
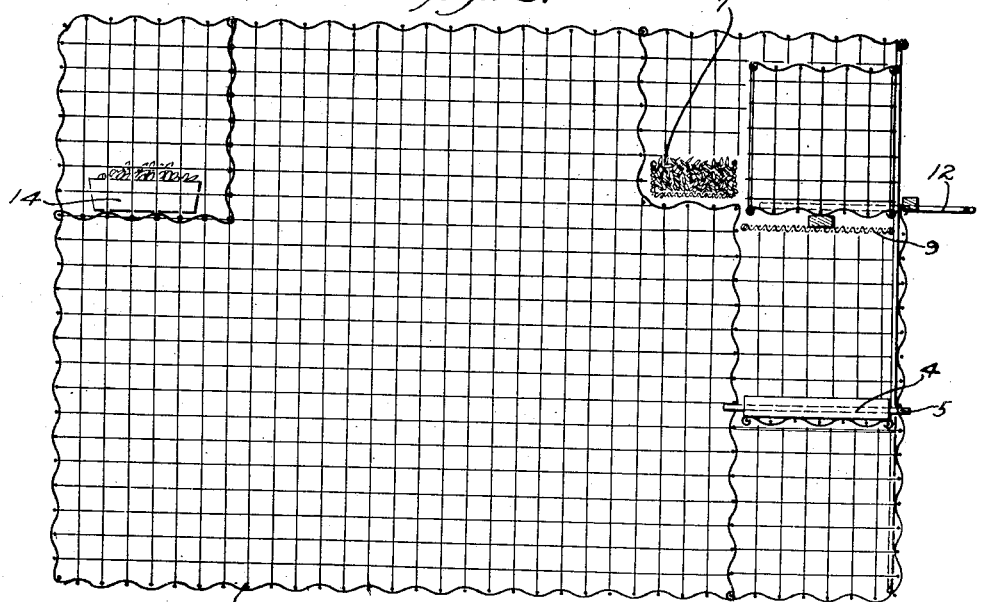

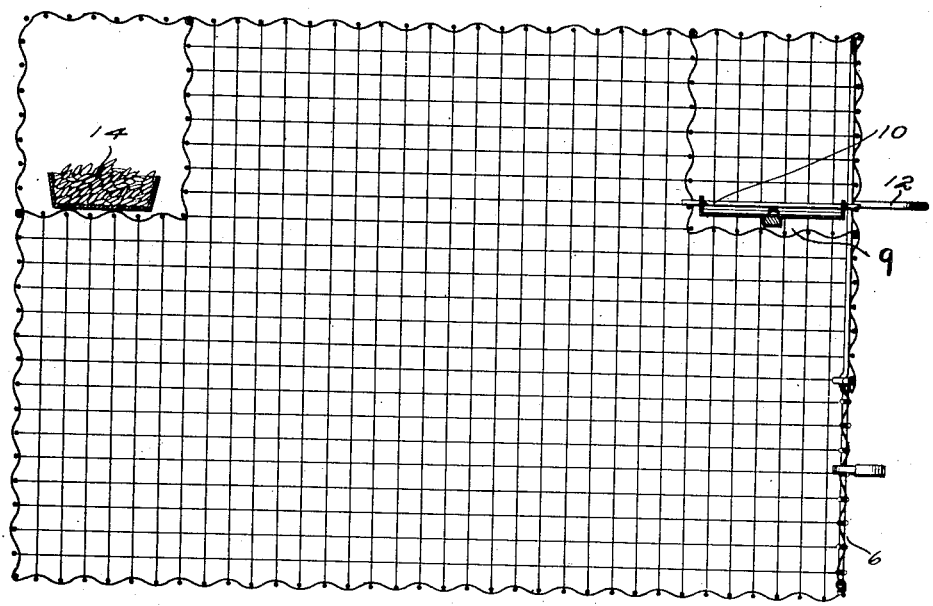
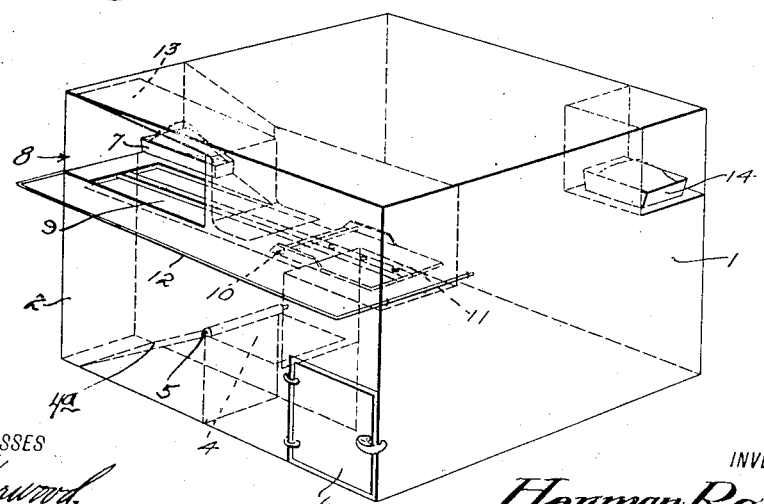

HERMAN ROHLFF, OF DAVENPORT, IOWA.

EVER-SET CAGE-TRAP.

1,347,407.  Specification of Letters Patent.  Patented July 20, 1920.

Application filed October 29, 1919. Serial No. 334,119.

*To all whom it may concern:*

Be it known that I, HERMAN ROHLFF, a citizen of the United States, and a resident of Davenport, county of Scott, State of Iowa, have invented a new and useful Ever-Set Cage-Trap, of which the following is a full, clear, and exact description.

The present invention relates to traps and has reference more particularly to a self-operated ever set cage trap, which is especially adaptable for trapping birds.

The primary object of the invention is to provide an effective means for trapping birds and confining the same without injury, in a cage so that they may act as a lure to induce other birds to enter the trap.

A further object of the invention is to so construct the trap that once caught there will be no chance of the birds escaping, and at the same time so arranging the entrance to the trap that it is always set and capable of operating an unlimited number of times without adjustment or attending to the trap in any way.

With these and other objects in view the invention will be more readily understood upon reference to the accompanying drawing in which—

Figure 1 is a front elevation of the trap, the wire covers of the same being broken away to show the operating portions.

Fig. 2 is a sectional view on the line 2—2 of Fig. 1,

Fig. 3 is a sectional view on the line 3—3 of Fig. 1, and

Fig. 4 is a perspective view of the trap.

Referring to the drawings in detail an important feature of the invention consists in constructing the cage 1, with a supplemental cage 2, with a communicating opening 3, between the cages normally closed by a trap door 4 pivoted as at 5, with its opposite end free to swing downwardly by the weight of the bird thereon, to leave an unobstructed passage between the cages. With this construction the cage 1 is normally closed to exit and provides a relatively large inclosure in which the birds may be indefinitely confined. They may be removed however when occasion demands through a door 6. The inclined trackway 4ª may serve as one partition for dividing the cages 1 and 2 as well as a means for enabling access to be had to the trap door 4.

The supplemental cage extends practically the height of the cage 1, and is provided with a bait receptacle 7 in the farthest end thereof, and an entrance 8 to the cage is provided in the supplemental part thereof and opposite the bait receptacle. Between this entrance 8 and the bait receptacle 7 is an ever set trap door 9 which is pivoted as at 10, the pivot being so arranged that the trap door will be maintained normally closed, but adapted to open by the weight of the bird thereon, to leave an unobstructed passage from the entrance into the supplemental cage, the opposite end of the trap door having a suitable weight 11 to return the door to a normally closed position. A suitable rest 12 is placed in front of the entrance to the supplemental cage and may serve as a perch on which the birds may alight prior to entering the cage.

Supported over the ever set trap door 9 is an auxiliary closure 13 which is normally inactive but operable to close the entrance to exit from the supplemental cage when the ever set trap door 9 is operating. The auxiliary closure when inactive will in no way interfere with the entrance as the same will lie against the top of the cage and, inasmuch as it is carried by the ever set trap door it will only be operated to active position when the trap door itself is operated. A second bait receptacle may be located as at 14.

As shown, the cage may be constructed of small mesh wire with the frame structure produced very readily by small metal rods, the same being bent at different angles to provide stiffening rods and usual top and bottom frame pieces for the mesh wire structure.

The operation of the trap is as follows: The bird lured to the trap by the bait 7 goes in entrance 8 alighting on the trap door 9, this door being pivoted at 10 the weight of the bird on 9 causes it to tilt downwardly, dropping the bird into supplemental cage 2; the bird then walks onto trap door 4 which being pivoted at 5, the weight of the bird now causes this trap door 4 to drop down depositing the bird into the portion of the cage adjacent the removal door 6, where it will stay until removed through such door, it being impossible for the bird to get out by the way it got in because the trap doors 9 and 4 have automatically resumed their normal positions.

Having thus described my invention what I claim as new and desire to secure by Letters Patent is as follows.

In an ever set cage trap, a confining cage and a supplemental cage, an entrance in the supplemental cage, a downwardly opening ever set trap door within said entrance closing the supplemental cage to exit when in normal closed position but operable downwardly to permit access to be had to said supplemental cage, an auxiliary closure for the opening left by said trap door when moved downwardly normally inactive but operable by the movement of said trap door to close said opening to exit when said ever set trap door is operated, and a communicating opening between the confining cage and the supplemental cage normally closed by a trap door operable independently from said ever set trap door to leave an unobstructed passage between the cages.

HERMAN ROHLFF.